(12) United States Patent
Stihi

(10) Patent No.: US 7,856,924 B1
(45) Date of Patent: Dec. 28, 2010

(54) COLLAPSIBLE BARBEQUE WITH VARIABLE FIREBED POSITION AND METHOD OF USE

(76) Inventor: Doru Stihi, 337 Sidney Rd., Pittstown, NJ (US) 08867

(*) Notice: Subject to any disclaimer, the term of this patent is extended or adjusted under 35 U.S.C. 154(b) by 1168 days.

(21) Appl. No.: 11/111,008

(22) Filed: Apr. 21, 2005

(51) Int. Cl.
*A47J 37/04* (2006.01)
(52) U.S. Cl. ............... 99/419; 99/421 H; 126/25 A; 126/25 AA; 126/25 R
(58) Field of Classification Search ............ 99/419, 99/421 H, 421 HV, 421 M, 421 R; 126/25 A, 126/25 AA
See application file for complete search history.

(56) References Cited

U.S. PATENT DOCUMENTS

| | | | | |
|---|---|---|---|---|
| 3,943,837 A | * | 3/1976 | Trkla | 99/339 |
| 4,572,062 A | * | 2/1986 | Widdowson | 99/345 |
| 4,627,410 A | * | 12/1986 | Jung | 126/25 A |
| 5,001,514 A | * | 3/1991 | Leonhart et al. | 355/79 |
| 5,001,971 A | * | 3/1991 | Beller | 99/421 H |
| 6,439,111 B1 | * | 8/2002 | Lu | 99/449 |
| 6,443,686 B1 | * | 9/2002 | Wiesler et al. | 414/590 |
| 6,745,673 B1 | * | 6/2004 | Martinez | 99/421 H |
| 2006/0096585 A1 | * | 5/2006 | Dahl | 126/25 A |

* cited by examiner

*Primary Examiner*—Tu B Hoang
*Assistant Examiner*—Brian Jennison
(74) *Attorney, Agent, or Firm*—Merek, Blackmon & Voorhees, LLC

(57) ABSTRACT

A cooking apparatus has a food support with food engaging structure, such as a rotisserie spit. A firebed is mounted under the food support to heat food at the food support. A heat reflective vault is mounted over the food support for reflecting radiant heat back down toward the food support. The vault extends over the food support while still providing access from the side. A drive mechanism can vertically adjust the firebed to adjust heat flowing toward the food support. An elevator motor may be coupled to the drive mechanism for vertically positioning the firebed. A thermostat responsive to heat from the firebed and coupled to the elevator motor can control elevation of the firebed.

15 Claims, 4 Drawing Sheets

COLLAPSIBLE BARBEQUE WITH VARIABLE FIREBED POSITION AND METHOD OF USE

BACKGROUND OF THE INVENTION

1. Field of the Invention

The present invention relates to cooking apparatus and methods, and in particular, to cooking techniques that make the cooking temperature adjustable and leave the cooking food easily accessible.

2. Description of Related Art

Home barbecues and other types of home cooking grills and rotisseries are adequate for cooking simple, small batches of food, but are inadequate for more demanding cooking. For example, cooking a whole pig is impossible with traditional home cooking devices. For this reason, consumers are left to their own devices, such as excavating a fire pit and building a fireproof structure to support a heavy-duty roasting spit. Such cooking arrangements are not only difficult to build, but difficult to operate. Maintaining a proper fire for delivering the correct amount of even heat is also difficult. Moreover, an open fire is relatively inefficient and most heat is dissipated into the environment.

Even when the food being cooked is a simple batch of hamburgers and hot dogs, conventional barbecues are lacking. The heat produced by a conventional charcoal barbecue varies dramatically over time. When the charcoal is first ignited little heat is delivered, but then the heat gradually rises to a peak before gradually declining as the charcoal is consumed. Therefore, the cook must avoid overcooking during the peak interval or undercooking cooking outside this peak interval.

In U.S. Pat. No. 5,996,572 charcoal tray 32 can be vertically adjusted by threaded crankshaft 56, relative to grill 30 or to motor-powered rotisserie shaft 96 mounted in cover 38. See also, U.S. Pat. Nos. 5,154,159, and 2,968,301

In U.S. Pat. No. 5,660,101 a food basket 25 can be turned by hand crank 26. The same hand crank circulates endless chain 31A to rotate camshaft 58. Thus as the food basket 25 is turned on edge, charcoal grill 33 is retracted by cam crank 53 to avoid a collision with food basket 25.

In U.S. Pat. No. 4,462,306 a support frame 90/92 for supporting a grill or rotisserie rod can be hoisted or lowered by cables 106, which are wound on shaft 140 of adjustment wheel 141.

The firebox 50 of U.S. Pat. No. 4,572,062 can be raised and lowered by placing the ends of handlebars 40 in different notches 32 of the rotisserie grill. A small pig or other food can be mounted on the spit 70 and rotated by motor 130. The roasting food can be covered by a cover 160 to provide a drum-shaped enclosure.

In U.S. Pat. No. 2,943,557 vertically adjustable firebox 30 protrudes through bottom opening 27 of conical reflector 20, and may be adjusted up and down using handle 55. Notches 56 engage bar 14, which is connected to arm 50 using pin 57.

In U.S. Pat. No. 3,379,190 fireboxes 23, 25 are supported by cantilever arms 27, which are vertically moveable in the grill housing. Using handles 51 to swing cranks 45 out of notches 49, fireboxes 23, 25 may be moved along slot 29 in post 15 to their desired vertical position.

In U.S. Pat. No. 6,809,297 temperature switch 38 regulates the temperature in cooking chamber 12. Motor 56 rotates spit 58. Motor 71 rotates heating element 44, and drive gear 74 is adapted and configured to engage "D" shaped wheel 76 for positioning hearing element 44 at various locations within cooking chamber 12.

In U.S. Pat. No. 5,000,083 heating unit 30 can be vertically displaced by motor 32. Motor 13 can operate turntable 11 and a separate motor 43 vertically displaces light curtain 40 relative to heating unit 30. Controller 50 automatically adjusts the position of heating unit 30 and serves as a timer.

In U.S. Pat. No. 5,928,544 the vertical position of heating elements 10 and 20 may be controlled by a motor 34.

In U.S. Pat. No. 3,757,675 firebox 15 is supported on cross members 13, which comprise a firebox track 16. Latches 21 and studs 20 allow the firebox to be horizontally adjusted along track 16 when the user grasps handle 23.

In U.S. Pat. No. 5,676,045 vertically-oriented second firebox 38 is positioned in housing 12 opposite first firebox 22. Handle 42 protrudes through an opening in the grill housing 12 and allows horizontal movement of firebox 38 using a roller on the grill's bottom 16.

In U.S. Pat. No. 4,418,615 firebox thermostat 44 controls the temperature within cooking chamber 15 by regulating the passage of air through firebox inlet port 17 and the corresponding combustion rate within firebox 12.

In U.S. Pat. No. 3,589,269 prod 36 of thermostat 35 projects into barbecuing oven 8 to determine the temperature of the oven. Current to heating element 39 is cut off when the predetermined temperature is reached, and switched back on when the temperature drops below a specified level.

In U.S. Pat. No. 4,663,517 as control housing 24 is rotated, heating element 28 and reflector 30 are also rotated within the grill bowl. Rotisserie rod 38 is operated by drive unit 42. Thermostat 194 is controlled by rotating knob 182 to switch the power to heating element 28 on and off. Thermostat 194 also detects ambient heat within housing 24 and adjusts the current to heating element 28 according to the position on control knob 182.

In U.S. Pat. No. 3,800,691 panel 4 includes oven thermostat 5 and panel 3 includes toast thermostat control and oven on-off switch 6. These switches control temperature inside the toaster oven.

In U.S. Pat. No. 5,667,714 drive means 7 rotates turntable 5 within cooking chamber 2. Turntable 5 is also vertically moveable, to allow even cooking of food.

In U.S. Pat. No. 6,564,793 firebox 21 is rotated by motor 17 in order to promote radiant and convective heating.

In U.S. Patent Application 2003/0015188 cooling fans 32 and 34, designed to regulate the temperature in region 30, are controlled by a processor module 36 in accordance with an output signal from temperature detector 42.

See also, U.S. Pat. Nos. 3,359,887; 3,490,357; 3,943,837; 4,089,258; 4,334,516; 4,462,306; 4,924,766; 5,140,896; 5,224,676; 5,410,950; 5,536,518; 5,649,475; 5,720,217; 6,131,505; 6,131,560; 6,138,553; 6,189,528; 6,314,955; D336,593; and D403,919.

SUMMARY OF THE INVENTION

In accordance with the illustrative embodiments demonstrating features and advantages of the present invention, there is provided a cooking apparatus having a food support with food engaging structure. The cooking apparatus also has a firebed mounted under the food support to heat food at the food support. Also included is a heat reflective vault mounted over the food support for reflecting radiant heat back down toward the food support. The vault extends over the food support while leaving the food support laterally accessible. The cooking apparatus also has a drive mechanism for vertically adjusting the firebed to adjust heat flowing toward the food support.

In accordance with another aspect of the present invention, a cooking apparatus is provided with a food support having food engaging structure. The cooking apparatus also has a firebed mounted under the food support to heat food at the food support. Also included is a drive mechanism for vertically adjusting the firebed to adjust heat flowing toward the food support. The cooking apparatus also includes an elevator motor and a thermostat. The elevator motor is coupled to the drive mechanism for vertically positioning the firebed. The thermostat is responsive to heat from the firebed and is coupled to the elevator motor for controlling elevation of the firebed.

In accordance with yet another aspect of the present invention, a cooking method is provided employing a firebed, a reflector, and a rotisserie spit with food engaging structure. The method includes the step of vertically adjusting the firebed to adjust heat flowing toward the rotisserie spit. The method also includes the step of reflecting radiant heat over the rotisserie spit back down toward the rotisserie spit without laterally enclosing the rotisserie spit.

By employing the apparatus and methods of the foregoing type an improved cooking technique is achieved. The presently disclosed cooking apparatus is able to cook a whole meat (pig. lamb, goat, turkey, gyros etc) evenly and thoroughly, and still be portable, user-friendly, safe, efficient, durable, compact and reliable; and last but not the least important: enjoyable to operate and fun to watch it.

In this disclosed embodiment, a firebed is mounted on a movable upper frame that can be lifted and lowered by a drive mechanism. Moreover, a rotisserie spit (or an ordinary grill) can be mounted over the firebed. A heat reflecting vault can be mounted over the rotisserie spit to reflect radiant heat back to the food on the spit, thereby increasing the cooking efficiency. In one constructed embodiment the vault was a cylindrical metal reflector mounted over the rotisserie spit, but with the sides of the rotisserie spit left accessible.

In the disclosed embodiment the drive mechanism for vertically adjusting the firebed is driven by a thermostatically controlled motor. Accordingly, the firebed can be moved vertically to regulate the amount of heat delivered to the food on the rotisserie spit.

The drive mechanism can be a scissor lift in the form of a pair of crossed members that are supported on a lower frame. As an example, the nut on a motor driven lead screw can operate the scissor lift to adjust the height of the firebed. The scissor lift allows the firebed to move within a wide vertical range, adjusting the amount of heat delivered to cook the food properly. The movement may be assisted by a temperature control system, backed-up by a manual control. In this way the temperature is maintained automatically at a desired value to facilitate even and thorough cooking.

The scissor lift also gives the apparatus a very low profile when collapsed. The overall collapsed height of the device may be kept very small by placing the charcoal tray of the firebed under the frame, in between the casters, when the apparatus is idle or stored. This design makes the apparatus portable and in one embodiment easily carried in a car trunk. The presently disclosed embodiment achieves portability by employing casters, lightweight materials, and by having a collapsible frame that can fit in a car trunk. Adaptability to a variety of power sources also enhances portability.

In this embodiment, user-friendliness and safety is achieved by avoiding a complicated set up, and by employing an automated temperature control that is easy and safe to use and is backed up by manual controls.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings, wherein.

DETAILED DESCRIPTION OF THE PREFERRED EMBODIMENTS

Figure 1:
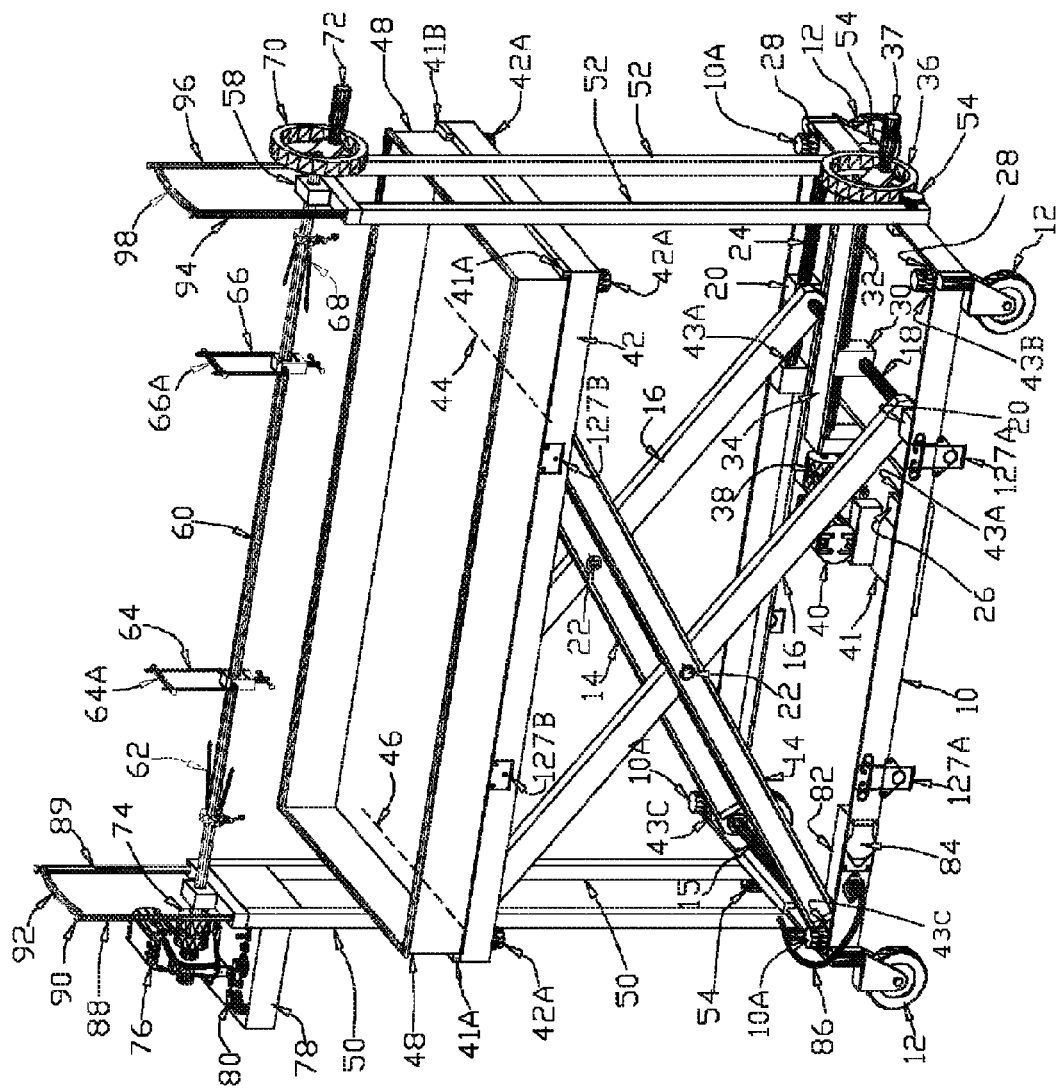
FIG. 1 is a perspective view of a cooking apparatus according to principles of the present invention.
Figure 2:
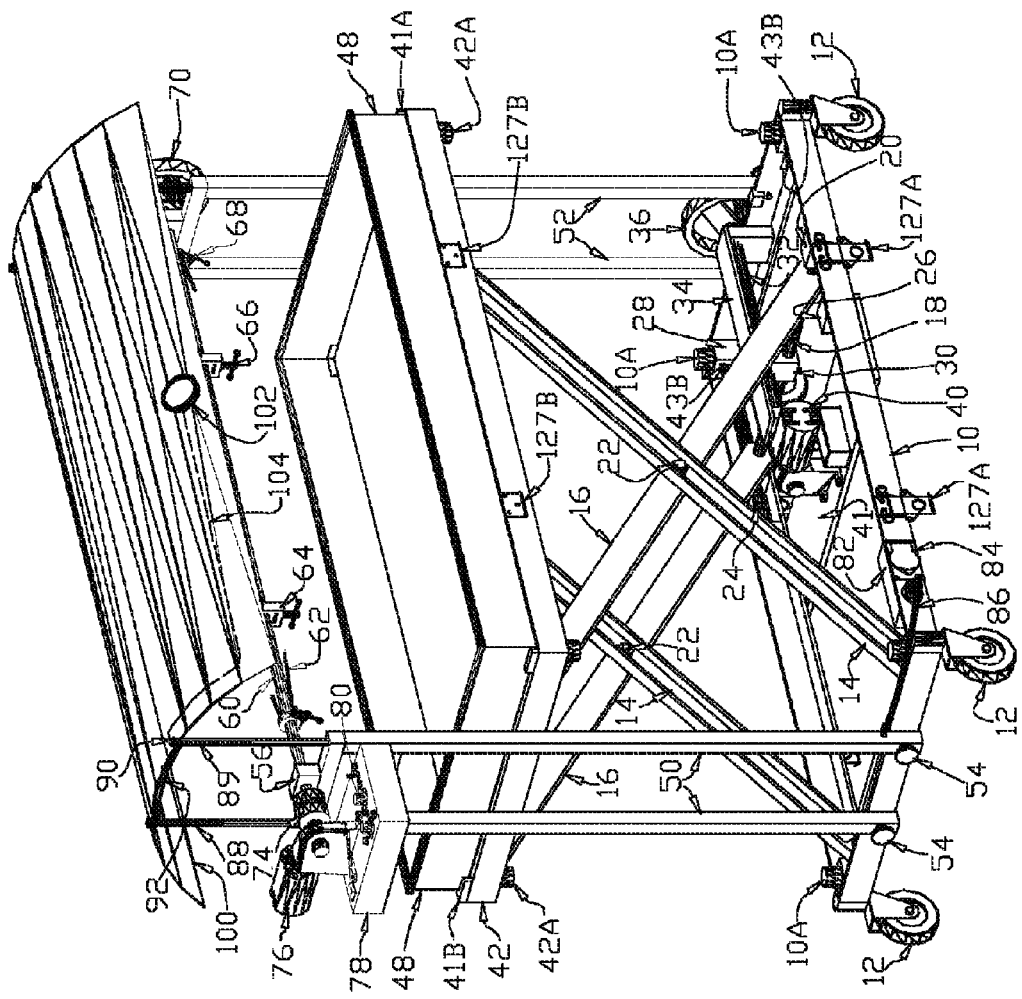
FIG. 2 is a different perspective view of the cooking apparatus of FIG. 1 with a heat reflecting vault installed.

Referring to FIGS. 1 and 2, the illustrated cooking apparatus has a four sided open lower frame 10 with wheels 12 and upwardly directed bumpers 10A at each corner. The lower ends of a parallel pair of scissors arms 14 are pivotally attached to shaft 15 journaled in bosses 43C, which are mounted in two adjacent corners of frame 10. A crossing pair of scissor arms 16 is pivotally attached to shaft 18, which is journaled at either end in a pair of sliding blocks 20. Arms 14 and 16 are attached together at pivot 22. The pair of blocks 20 slide on respective shafts 24, which are supported in bosses 26 and 28 mounted in the inside of frame 10 (bosses 28 are located in two adjacent corners of frame 10).

The center of shaft 18 is journaled in nut 30, which is threaded on lead screw 32, which is rotatably mounted on the underside of bracket 34. The outside end of shaft 32 is attached to crank wheel 36, which has a handle 37. The inside end of lead screw 32 is attached through splined connector 38 to elevator motor 40, which is supported on platform 41 of frame 10.

A firebed 48 in the form of a metal pan designed to hold a charcoal fire, rests inside stops 41A and 41B on upper frame 42. In one embodiment pan 48 was 48 inches (122 cm) long and 24 inches (61 cm) wide, although these dimensions may be different in other embodiments. Upper frame 42, constructed in a manner similar to lower frame 10, has downwardly directed bumpers 42A, and a shaft 44 supported on sliding blocks 120 (shown in FIG. 3 together with one of the supporting blocks 126). Shaft 44 and sliding blocks 120 are constructed and mounted in a fashion similar to blocks 20 and shaft 18 on frame 10.

The upper ends of scissor arms 14 are pivotally attached to shaft 44. The upper ends of scissor arms 16 are pivotally attached to shaft 46 (shown in phantom in FIG. 1) which is mounted in a manner similar to previously mentioned shaft 15.

Accordingly, scissor arms 14 and 16 act as a scissor lift or drive mechanism for vertically adjusting the height of upper frame 42. Specifically, elevator motor 40 can turn lead screw 32 to move nut 30 and shaft 18 longitudinally. Consequently, the spacing between the lower ends of arms 14 and 16 changes to change the angle between arms 14 and 16. In response, the height of frame 42 changes as shaft 44 moves in the same direction as shaft 18 to accommodate the motion of arms 14/16.

Limits switches 43A and 43B mounted in frame 10 can shut off motor 40 when sliding block 20 reaches one of the ends of shaft 24. In one embodiment upper frame 42 had a height that was adjustable from 10 inches (25 cm) to 42 inches (106 cm), although this range may be different in other embodiments.

Frames 50 and 52 have an inverted U shape and are attached to frame 10 by thumb screws 54. The frames 50 and 52 are made of square aluminum tubes to lower the overall weight. Bearing blocks 56 and 58 are self-lubricated bearings made of graphite bronze and are mounted atop frames 50 and 52, respectively. Bearings 56 and 58 have a hinged, clamshell construction allowing the bearings to hold or quickly release rotisserie spit 60. Spit 60 has a number of conventional skewers 62, 64, 66 and 68 designed to hold food such as a whole adult pig, weighing perhaps 70 pounds (32 kilograms) or more. While a rotisserie spit is illustrated herein, in other embodiments the spit may be replaced with another food support such as a grill having a number of parallel, spaced metal bars.

A crank wheel 70 having a handle 72 is attached to one end of spit 60, the other end being attached through the splined connector 74 to spit motor 76, which is supported by box 78, which is in turn supported by frame 50. Box 78 contains a motor control, such as a commercially available motor speed controller designed to adjust the speed of motor 76. The motor control has manual controls such as knobs and switch handles for adjusting the speed and direction of motor 76 (and as will be described presently, the direction of motor 40). Specifically, there are four controls: two for the scissor lift 14/16 and two for the spit 60. In particular the angular speed of the spit 60 may be regulated to a constant speed somewhere between 6 to 20 rpm, although other speed ranges are contemplated (e.g., between 10 to 12 rpm). The two controls for the scissor lift 14/16 command raising and lowering of firebed 48 and also control the speed of movement. The lift controllers operate in automatic and/or manual modes.

Power is brought to box 78 from junction box 82 which has a socket 84 for receiving a power supplying line (not shown). A power cord 86 plugged into junction box 82 is routed through the inside of frame 50 into the interior of box 78. As described further hereinafter, signal lines (not shown) embedded in column 88 terminate in contacts 90, for purposes to be described presently. Column 88 and column 89 are attached atop frame 50 and are spanned by a bridge 92. Likewise, columns 94, 96 are mounted atop frame 52 and spanned by bridge 98. Elements 88-98 support a heat reflective vault 100, for example, a cylindrical metal reflector that may be made of sheet aluminum or stainless-steel. The reflector 100 has a concave underside.

A combined temperature gauge and thermostat 102 centrally mounted along one edge of reflector 100 can display temperature and send a temperature signal along line 104, which runs along the underside of reflector 100 to connect to the contacts 90 of column 88. In this embodiment the case of thermostat 102 can be rotated to adjust the temperature setpoint. If the temperature sensed by thermostat 102 is close to the temperature setpoint no signal is sent along line 104. If the sensed temperature is sufficiently greater or less than the temperature setpoint a high or low signal, respectively, will be sent along line 104.

The frame 10/42 is made of aluminum angles in one embodiment to provide strength and lightness. Also it is easy to machine or weld it. The scissor lift 14/16 uses aluminum channels that are more substantial to sustain the forces created when in operation.

To facilitate an understanding of the principles associated with the foregoing apparatus, its operation will be briefly described. The cooking apparatus can be set up as shown in FIG. 1 and the wheels 12 (with brakes) ensure excellent maneuverability. To begin, a user can fill firebed 48 with charcoal or other combustible fuel and ignite it. The user can also release clamshell bearings 56 and 58 and then pull spit 60 out axially, disconnecting it from splined connector 74.

In the usual fashion, spit 60 can be inserted through a piece of meat such as a whole adult pig. The skewers 64 and 66 can be inserted radially through the pig carcass (and locked with the crosspieces 64A and 66A) while skewers 62 and 68 can be inserted into either end of the pig. Thereafter the spit 60 can be reconnected to spline connector 74 and placed in bearings 56 and 58, which are then closed. Next, the user can fasten reflector 100 atop posts 88, 89, 94, and 96, being careful to establish an electrical connection between contacts 90 and thermostat lead 104.

The user can check the cooking temperature by observing the reading on thermostat 102. If the temperature is inappropriate, the height of firebed 48 can be adjusted by turning crank wheel 36 to rotate lead screw 32 and move nut 30 axially. As previously mentioned, shaft 18 and sliding blocks 20 move with nut 30 to change the separation between the lower ends of scissor arms 14 and 16, thereby changing the elevation of frame 42 and firebed 48.

The user can continually turn crank wheel 70 to rotate spit 60 and the meat supported thereon. In some cases crank wheel 70 may be turned in angular increments every five minutes or so. In most cases, however, the user will operate controls 80 on control box 78 to start motor 76 and rotate spit 60. These controls can be used to set the direction of rotation as well as setting the speed, somewhere in the range of perhaps 6-20 RPM.

The power for this process will be supplied by a power cord plugged into junction box 82, which will in turn transmit power through cable 86 to control box 78. This power can be supplied by a public utility or, for embodiments having appropriate power converters, from a storage battery, such as an automobile battery.

As the cooking proceeds the heat from firebed 48 can change. The user may operate controls 80 to begin automatically adjusting the height of firebox 48. The target temperature is set by turning the thermostat body 102 to set the desired temperature. If the temperature measured by thermostat 102 is within 5 degrees Fahrenheit of the target temperature, no signal is sent through line 104. If the measured temperature differs from the target temperature by more than 5 degrees Fahrenheit a high or low signal, as appropriate, is issued along line 104 and through the wires (not shown) in column 88, finally providing a signal inside control box 78. Alternatively, an analog temperature signal can be transmitted from thermostat 102 and sensed inside control box 78 by a comparator (not shown), which produces an up or down signal, as appropriate.

In any event, the up or down signal is converted in control box 78 into a motor control signal that is routed through wires (not shown) inside frame 50 and along the inside of frame 10 to motor 40. This motor control signal causes motor 40 to spin in the appropriate direction, turning lead screw 32 in order to drive nut 30 in the requisite direction. For example, if the temperature measured by thermostat 102 was too far above the target temperature, a down signal sent to control box 78 to produce a motor control signal ultimately causing nut 30 to move outwardly to separate the lower ends of scissor arms 14 and 16, thereby lowering frame 42 and firebed 48.

Using any one of various well-known control techniques, firebed 48 can either be lowered by some fixed increment or lowered by an amount calculated to be appropriate to eventually reduce the measured temperature to the target temperature. Alternatively, motor 40 can turn lead screw 32 very slowly to avoid overshooting the position needed to achieve the target temperature.

In some cases the user will simply observe that the temperature reading from thermostat 102 is out of the desired range and use controls 80 to steer motor 40 to bring firebox 48 to an elevation deemed appropriate by the user.

As the meat on spit 60 cooks, heat from firebed 48 or from the meat itself can radiate upwardly, but will be reflected back toward the cooking meat by reflector 100. This greatly increases the efficiency of the cooking. Also, reflector 100 does not fully enclose the meat on spit 60. Therefore, the user can watch the cooking process to judge its progress or simply for the pleasure of watching. Moreover, since the cooking meat is accessible from the side, the user is able to baste the meat or make sample cuts to judge how well the meat is cooking.

Eventually, the meat on spit 60 will be done and the roasted meat can be served directly from spit 60. In that case, the user will want to lower firebed 48 to the lowest position and perhaps extinguish the fire therein. The user will then stop motors 76 and 40. The reflector 100 can now be removed. In some cases spit 60 will be released from bearings 56 and 58 and spline connector 74 so the roasted pig can be carried to a carving or serving table. The meat on spit 60 can be removed by releasing skewers 62-68 and removing crank wheel 70.

When the foregoing cooking apparatus is no longer needed the ashes in firebed 48 can be discarded and firebed 48 and spit 60 with its skewers 62-68 can be cleaned. If convenient, the cooking apparatus can be moved to or near a storage or transport location where the breakdown and storage can be completed.

Using either crank wheel 36 or motor 40, frame 42 will now be fully lowered to rest against frame 10. Frames 50 and 52 can be disconnected from frame 10 by unscrewing thumbscrews 54, which can later be rethreaded into frame 10. If desired, columns 88, 89, 94, and 96 can be detached from frames 50 and 52.

Figure 3:
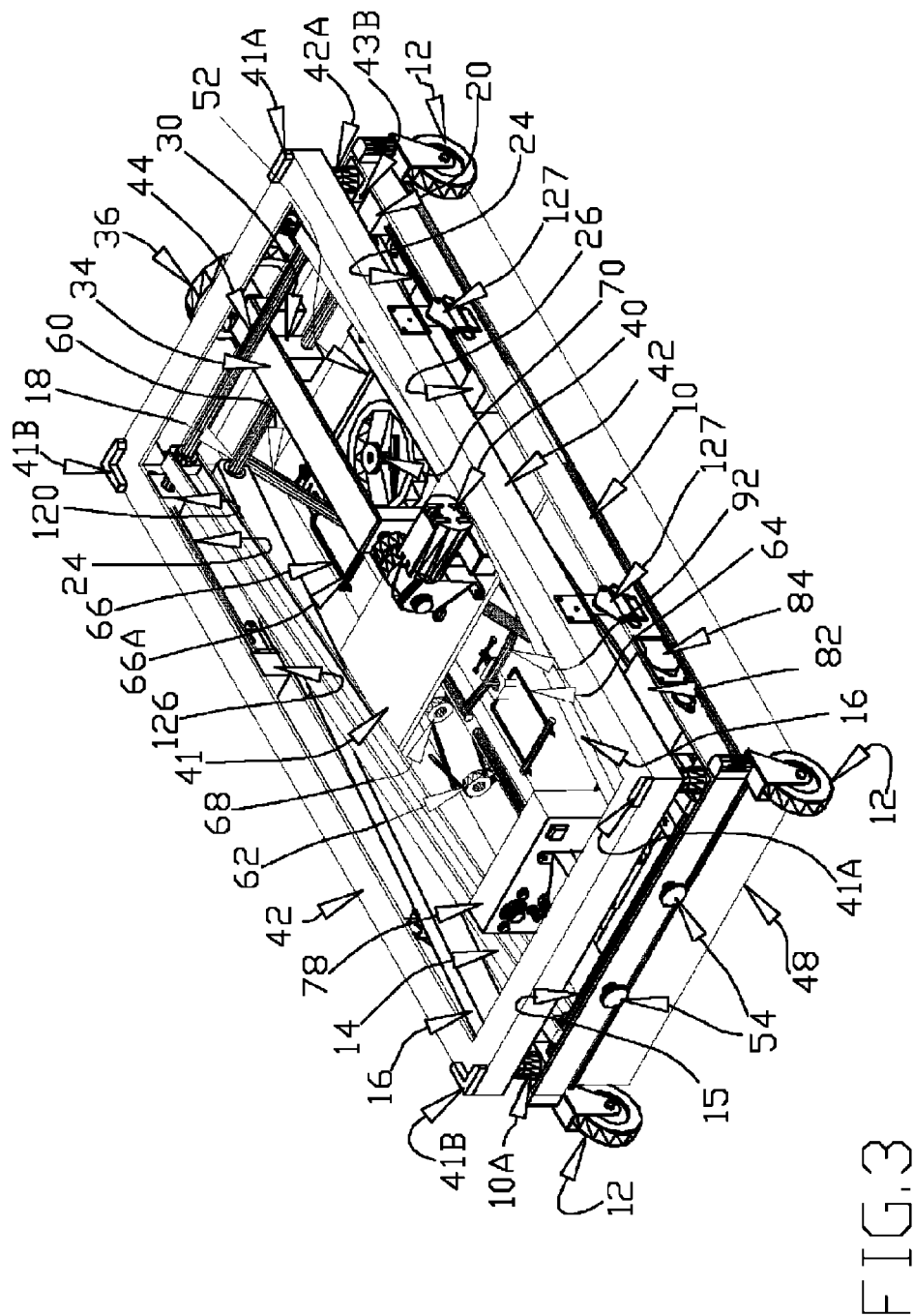
FIG. 3 is a perspective view of the cooking apparatus of FIG. 1 partially disassembled, collapsed, and packed for storage.

Referring to FIG. 3, the various disassembled components can be packed as shown. This packing can be done after the frames 10 and 42 are wheeled to a storage location or hoisted onto a transport (e.g., the trunk of an automobile). The firebed 48 can first be filled with various components such as skewers 62-68, wheel 70, frame 52, etc. The loaded firebed 48 can then be slid under frame 10 between the wheels 12. Certain bulky items may be placed inside firebed 48 after sliding it under frame 10. For example, one may wish to so delay packing the frame 50, which remains attached to the relatively bulky control box and motor 76.

Figure 4:
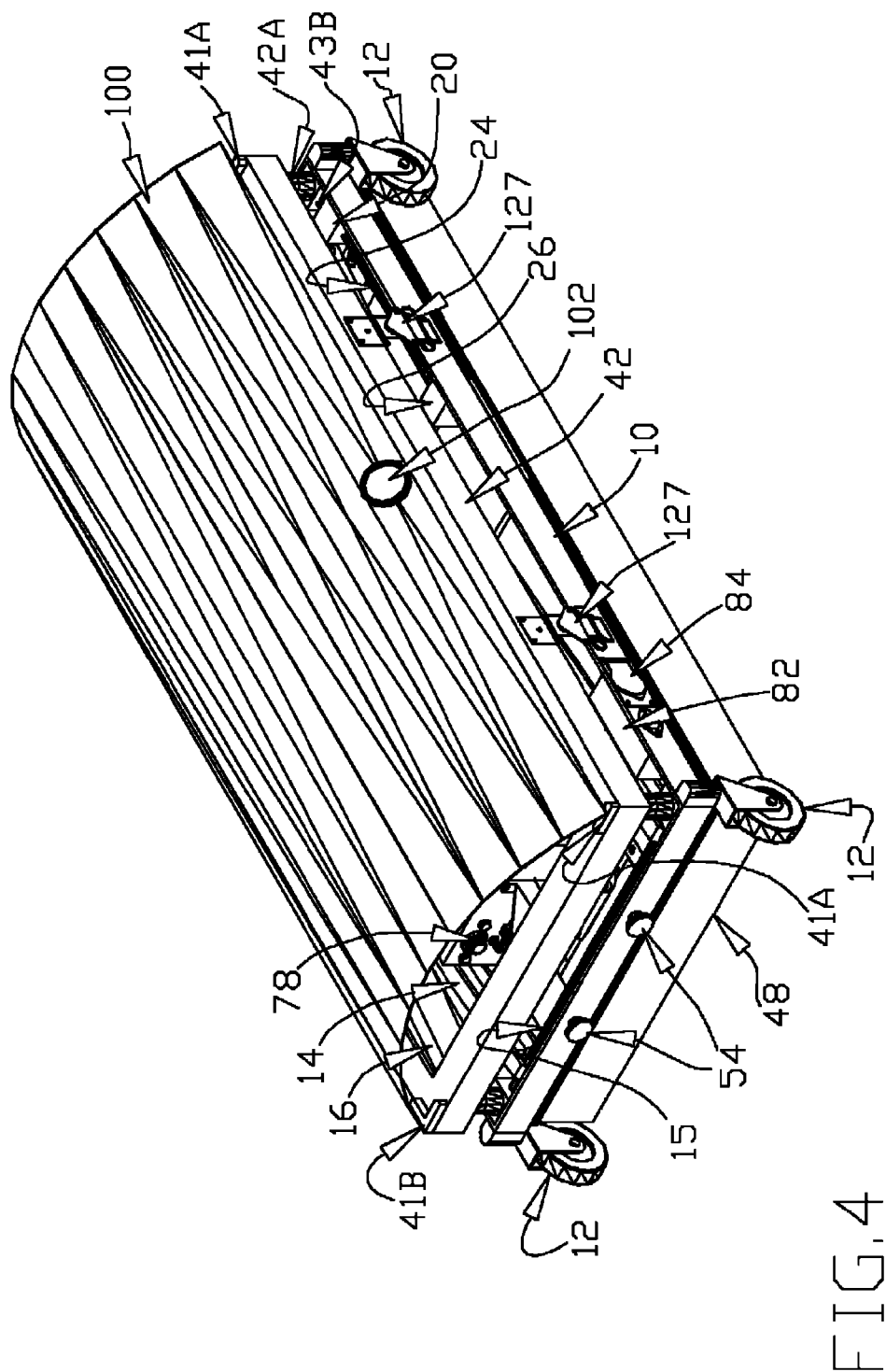
FIG. 4 is a perspective view of the cooking apparatus of FIG. 3 covered with the heat reflecting vault in place.

Once all the components are packed inside firebox 48 and frames 10/42, reflector 100 can be placed over everything. Latches 127A on frame 10 can then connect with four mating catches on frame 42 (elements 127A and 127B, being referred to as latches 127) to hold all items together. See FIG. 4. Alternatively, the assembly can be held together with straps, bungee cords, or the like. When fully closed, the scissor lift 14/16 and the motors (electrical or hydraulic) are hidden and protected inside the frame 10/42. They do not contribute to the overall height of the apparatus. The overall height is primarily determined by the thickness of the aluminum frames 10/42 and the wheels 12. The resulting package may be about 12 inches tall and can easily be stored in a garage or various other storage locations.

This sturdy design and the use of non-corrosive materials, and self-lubricating bearings provides reliability, durability and low maintenance.

It is appreciated that various modifications may be implemented with respect to the above described, preferred embodiment. For example, the temperature may be measured by a wireless thermometer inserted into the roasting meat. In some embodiments the rotisserie spit may be replaced with a conventional grill. The drive mechanism for adjusting the height of the firebox may employ hoisting cables or chains, hydraulic pistons, vertical lead screws, rack and pinions, etc. The size, shape, and thickness of the various components, as well as the materials used to build the components, can be selected to produce the desired strength, durability, temperature stability, styling, etc.

Obviously, many modifications and variations of the present invention are possible in light of the above teachings. It is therefore to be understood that within the scope of the appended claims, the invention may be practiced otherwise than as specifically described.

The invention claimed is:

1. A cooking apparatus comprising:
   a food support having food engaging structure;
   a firebed mounted under said food support to heat food at the food support;
   a heat reflective vault mounted over said food support for reflecting radiant heat back down toward said food support, said vault extending over said food support while leaving said food support laterally accessible;
   a thermostat responsive to heat from said firebed and coupled to an elevator motor for controlling elevation of said firebed; and
   a drive mechanism for vertically adjusting said firebed to adjust heat flowing toward said food support.

2. A cooking apparatus according to claim 1 wherein said food support comprises:
   a rotisserie spit.

3. A cooking apparatus according to claim 2 wherein said rotisserie spit is sized to support a whole adult pig.

4. A cooking apparatus according to claim 1 comprising:
   a spit motor coupled to said rotisserie spit for rotating said spit.

5. A cooking apparatus according to claim 4 comprising:
   a motor control coupled to said spit motor for controlling a speed of said spit motor.

6. A cooking apparatus according to claim 4 wherein said rotisserie spit has a connector for manually and quickly disconnecting said rotisserie spit from said spit motor.

7. A cooking apparatus according to claim 1 wherein said vault is gutter shaped.

8. A cooking apparatus according to claim 1 comprising:
   an upper frame for supporting said firebed; and
   a lower frame, said drive mechanism being coupled between said upper and said lower frame and being operable to collapse them together.

9. A cooking apparatus according to claim 8 wherein said food support includes a rotisserie spit, said vault and said rotisserie spit being collapsible onto said firebed and said upper frame.

10. A cooking apparatus according to claim 8 comprising:
    a plurality of wheels mounted under said upper frame, said upper frame being collapsible onto said lower frame to an elevation of less than 1 meter.

11. A cooking apparatus according to claim comprising:
an elevator motor coupled to said drive mechanism for vertically positioning said firebed.

12. A cooking apparatus according to claim 1 comprising:
at least one limit switch responsive to motion of said firebed and coupled to said elevator motor for stopping said elevator motor in order to prevent excessive travel of said firebed.

13. A cooking apparatus according to claim 11 comprising:
an upper frame for supporting said firebed; and
a lower frame, said drive mechanism including:
a scissor lift connected between said upper and said lower frame, said scissor lift having a pair of upper ends coupled to said upper frame and a pair of lower ends; and
a lead screw coupled to said elevator motor and having a nut for adjusting the spacing between the pair of lower ends of said scissor lift.

14. A cooking apparatus comprising:
a rotisserie spit having food engaging structure and sized to support a whole adult pig;
a spit motor coupled to said rotisserie spit for rotating said rotisserie spit, said rotisserie spit having a connector for manually and quickly disconnecting said rotisserie spit from said spit motor;
a motor control coupled to said spit motor for controlling a speed of said spit motor;
a firebed mounted under said rotisserie spit to heat food at the rotisserie spit;
a reflector mounted over said rotisserie spit for reflecting radiant heat back down toward said rotisserie spit while leaving said rotisserie spit laterally accessible;
an upper frame for supporting said firebed;
a drive mechanism for vertically adjusting said firebed to adjust heat flowing toward said food support;
an elevator motor coupled to said drive mechanism for vertically positioning said firebed;
a thermostat responsive to heat from said firebed and coupled to said elevator motor for controlling elevation of said firebed;
a lower frame, said drive mechanism being coupled between said upper and said lower frame and being operable to collapse said upper frame and said lower frame together, said reflector and said rotisserie spit being collapsible onto said firebed and said upper frame;
a plurality of wheels mounted under said lower frame, said upper frame being collapsible onto said lower frame to an elevation of less than 1 meter; and
at least one limit switch responsive to motion of said firebed and coupled to said elevator motor for stopping said elevator motor in order to prevent excessive travel of said firebed, said drive mechanism including:
a scissor lift connected between said upper and said lower frame, said scissor lift having a pair of upper ends coupled to said upper frame and a pair of lower ends; and
a lead screw coupled to said elevator motor and having a nut for adjusting the spacing between the pair of lower ends of said scissor lift.

15. A cooking apparatus comprising:
a base having four walls and a plurality of wheels movably supporting the base above an environment below the base forming a pocket below said base;
a plurality of risers connecting said base to a rotisserie spit, said spit having food engaging structure and sized to support a whole adult pig;
a spit motor located at a top portion of one of said plurality of risers and coupled to said rotisserie spit for rotating the spit;
said rotisserie spit having a connector for manually and quickly disconnecting said rotisserie spit from said spit motor;
a reflector mounted over said rotisserie spit on a selectively collapsible riser extensions on said risers for reflecting radiant heat back down toward said rotisserie spit while leaving said rotisserie spit laterally accessible;
a drive mechanism located within the four walls of the base for vertically adjusting a height of a firebed frame and firebed tray to adjust heat flowing toward said food support;
said firebed frame supporting said firebed tray above said drive motor and below said rotisserie spit, by scissor legs movably connected to said drive motor, such that moving said scissor legs towards each other raises said firebed frame relative to said rotisserie spit to control the temperature of heating elements on a firebed tray on said rotisserie spit, and moving said scissor legs away from each other lowers said firebed frame relative to said rotisserie spit;
at least one limit switch responsive to motion of said firebed frame and coupled to an elevator motor for discontinuing lowering of said firebed frame toward said base when said cooking apparatus is in a collapsed position with said firebed frame directly adjacent said base;
said elevator motor located within the four walls of said base and coupled to said drive mechanism for vertically positioning said firebed frame by moving the scissor legs;
said drive mechanism being coupled between said fire bed and said base to collapse the firebed frame adjacent said base;
said firebed tray being removable from said firebed frame and storable beneath said base in the pocket;
said risers being removable from said base and being sized to fit within said firebed frame and base for storage when said riser extensions are in a collapsed condition and said cooking apparatus in the collapsed position;
said rotisserie spit and spit motor being collapsible within said firebed frame and onto said upper frame such that said rotisserie spit and spit motor fit wholly within a length of said firebed frame when said cooking apparatus is in the collapsed position;
said reflector removable from said riser extensions and sized to mate with said firebed frame to form a cover over said rotisserie spit, spit motor, firebed frame and base when said cooking apparatus is in the collapsed position; and
said cooking apparatus having an overall height less than one meter in the collapsed position with said reflector installed on said firebed frame housing, said rotisserie spit, motor and risers fitted within said firebed frame and base; said firebed frame lowered directly adjacent said base; and said firebed frame firebed tray stored below said base.

* * * * *

UNITED STATES PATENT AND TRADEMARK OFFICE
CERTIFICATE OF CORRECTION

| | |
|---|---|
| PATENT NO. | : 7,856,924 B1 |
| APPLICATION NO. | : 11/111008 |
| DATED | : December 28, 2010 |
| INVENTOR(S) | : Doru Stihi |

It is certified that error appears in the above-identified patent and that said Letters Patent is hereby corrected as shown below:

Claim 11, Column 9, Line 1, "claim comprising" should be -- claim 1 comprising -- (See Amendment filed on April 30, 2010, patent application claim 11)

Claim 13, Column 9, Line 15, "coupled to said elevator" should be -- coupled to an elevator -- (Examiner interview, September 2, 2010)

Claim 14, Column 9, Line 56, "coupled to said elevator" should be -- coupled to an elevator -- (Examiner interview, September 2, 2010)

Signed and Sealed this
Twenty-second Day of March, 2011

David J. Kappos
*Director of the United States Patent and Trademark Office*